United States Patent [19]

Smrt

[11] 4,170,089
[45] Oct. 9, 1979

[54] HANGING FLOWER POT

[76] Inventor: Thomas J. Smrt, 172 S. Northwest Highway, Cary, Ill. 60013

[21] Appl. No.: 826,938

[22] Filed: Aug. 22, 1977

[51] Int. Cl.² .............................................. A01G 9/02
[52] U.S. Cl. ........................................... 47/67; 47/79
[58] Field of Search ............ 47/62, 66, 67, 71, 79–83, 47/59, 39; D6/113

[56] References Cited

U.S. PATENT DOCUMENTS

| | | | |
|---|---|---|---|
| 52,200 | 1/1866 | Prince | 47/67 |
| 650,614 | 5/1900 | Roeseler | 47/79 |
| 1,648,570 | 11/1927 | White | 47/67 |
| 1,789,616 | 1/1931 | Bjorklund | 47/79 |
| 2,110,059 | 3/1938 | Brimm | 47/79 X |
| 3,079,037 | 2/1963 | Schechter | 47/71 X |
| 3,930,334 | 1/1976 | Johnston | 47/82 |
| 3,943,661 | 3/1976 | DeVito | 47/67 |
| 4,032,102 | 6/1977 | Wolf et al. | 47/67 X |

FOREIGN PATENT DOCUMENTS

| | | | |
|---|---|---|---|
| 29425 | 3/1907 | Austria | 47/80 |
| 157983 | 2/1940 | Austria | 47/79 |
| 12057 | of 1896 | United Kingdom | 47/81 |

*Primary Examiner*—E. H. Eickholt

[57] ABSTRACT

A hanging flower pot includes a hanger and a drip tube in the bottom so that a plurality of pots can be hung vertically and water will drip downwardly from the drip tube rather than from the outer edge of the flower pot. The hanger extends across the drip tube, and a second pot can be supported below the first pot by a hanger so that the water which drips from the upper pot falls into the lower pot. Each of the hangers can be secured inside of the lower pot or can be provided with an upwardly curved drip portion to prevent water from running down the hanger to the outside of the lower pot.

9 Claims, 13 Drawing Figures

HANGING FLOWER POT

BACKGROUND AND SUMMARY

This invention relates to flower pots, and, more particularly, to a hanging flower pot which is provided with a hanger which adapts a plurality of flower pots to be hung in a vertical line and a drip tube which directs the dripping of water from the flower pot.

Flower pots or planters, particularly flower pots or planters which are intended to be hung from a hook or other support, are often provided with an opening in the bottom so that when the plant is watered, excess water can drip from the opening rather than pooling at the bottom of the pot. However, water which flows through the opening frequently runs along the bottom of the pot and drips from the outer edge of the pot, particularly when the pot is not hanging precisely level. If a pan or other collector is placed below the opening to catch the water, water might miss the pan if the water drips from the outer edge of the pot.

Some pots may be provided with a saucer bottom or rim into which the water can flow. However, if such a pot is not hanging level, water might spill over the side of the saucer.

It may be desirable to hang two or more flower pots in a generally vertical line. For example, a plurality of hanging planters provide a flexibility in plant arrangement as well as saving space and watering time. Flower pots made in accordance with the invention include a hanger so that a plurality of pots can be hung vertically. The flower pot is also provided with a drip tube in the bottom wall which directs the dripping of excess water when the pots are watered. The drip tube includes a lower edge which projects below the adjacent portion of the bottom wall, and water which runs down the drip tube will drip from the lower edge rather than run out to the outer edge of the pot. If a plurality of pots are hung vertically, a hanger rod extending across the drip tube of a pot can be used to support the lower pots, and water will drip downwardly from the drip tube of each pot to the next pot. The pots can be supported by hangers which are secured within the lower pot or which are provided with upwardly curved drip portions so that any water running down the rods will drip from the drip portion into the next pot.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
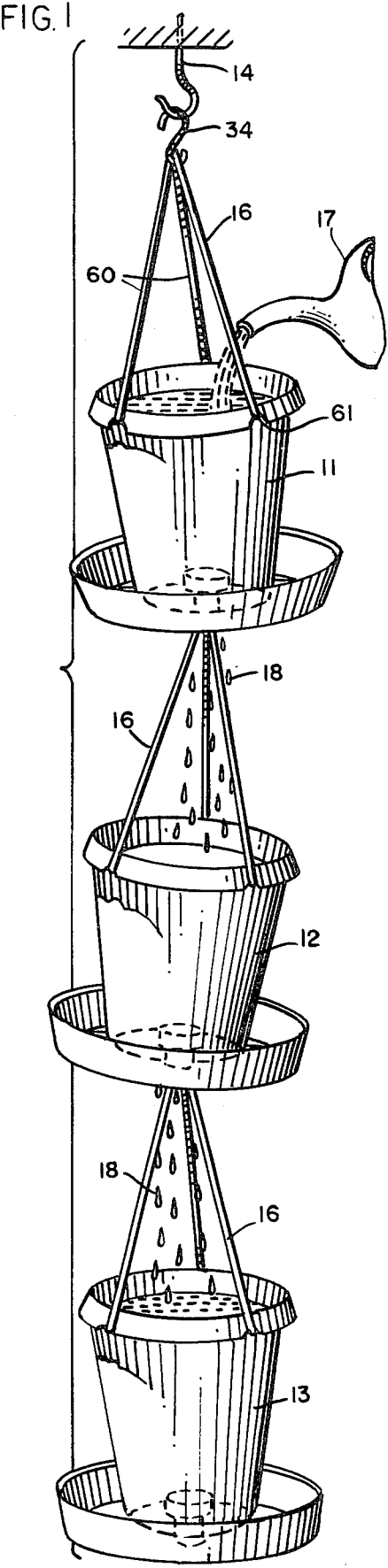
FIG. 1 is a perspective view of a plurality of hanging flower pots formed in accordance with the invention.

FIG. 1 illustrates a plurality of flower pots 11, 12, and 13 which hang generally vertically downwardly from a hook 14 which is secured to a ceiling or other support. As used herein, the term "flower pot" is intended to refer generally to a pot or planter for use with any type of plant and is not meant to be limited to a pot for flowers only.

Each of the pots is supported by a hanger 16, and each of the pots below the first or top pot is positioned generally vertically below one or more pots. The upper pot 11 is being watered in FIG. 1 by a watering can 17, and water which soaks through the soil or planting medium of each pot drips downwardly through a drip opening in the bottom of the pot to the next pot as indicated by the water drops 18.

Figure 2:
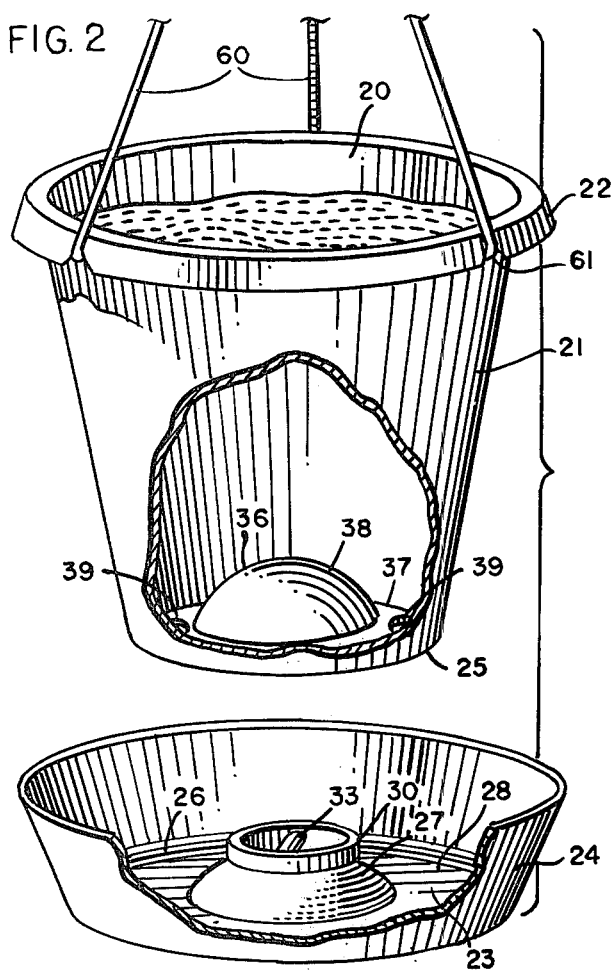
FIG. 2 is an exploded perspective view, partially broken away, of one of the pots.
Figure 3:
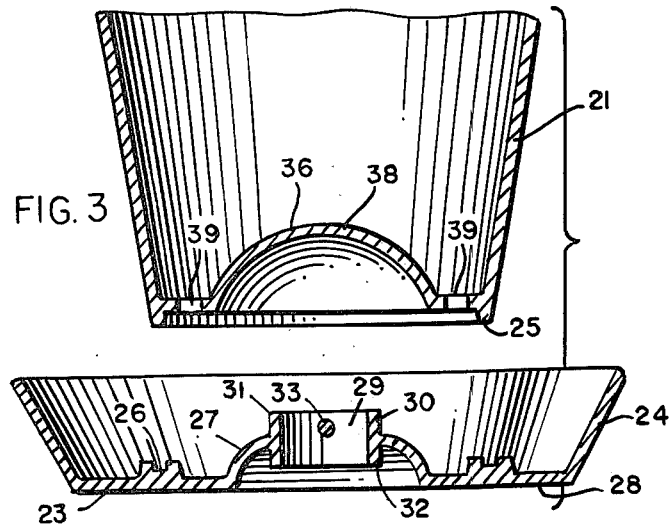
FIG. 3 is an exploded fragmentary sectional view of one of the pots.

The details of the pots are shown in FIGS. 2 and 3. Each pot has an open upper end 20 provided by a frusto-conical side wall, and the upper edge of the side wall terminates in a downwardly turned perimetric flange or rim 22. A separately formed bottom wall 23 is connected to the bottom of the side wall, and the outer edge of the bottom wall includes an upwardly and outwardly diverging rim 24 to provide the flower pot with the appearance of a bottom saucer. The side wall of the flower pot has a lower edge or bead 25 which is sized to be inserted into a circular channel 26 on the bottom wall. The channel and the lower edge are connected together and sealed by waterproof adhesive, mechanical attachment, or the like.

The bottom wall includes a central dome-shaped portion 27 which extends upwardly from a flat annular supporting portion 28, and the center of the dome 27 is provided with an opening 29 which is defined by a tubular wall 30. The tube 30 includes an upper edge 31 which is positioned above the dome and a lower edge 32 which is positioned below the adjacent portion of the dome but above the flat supporting portion 28 of the bottom wall.

Figure 4:
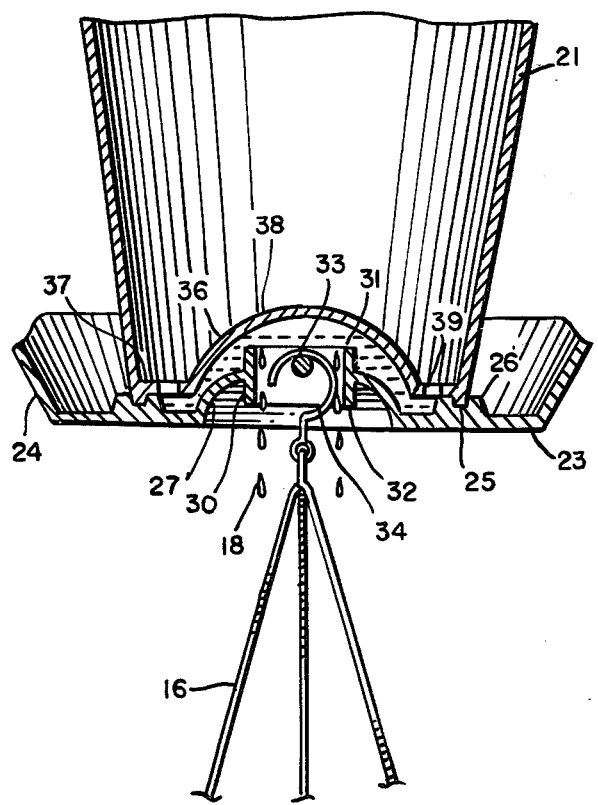
FIG. 4 is a fragmentary sectional view of one of the pots showing water dripping through the drip tube.

A hanging bar or rod 33 is inserted through openings in the tube and extends across the tube. Each of the hangers 16 includes a hook 34 (FIGS. 1 and 4), and the hooks of the second and lower pots are connected to the hanging rod of the next higher pot as illustrated in FIG. 4. The hook 34 of the first pot is connected to the hook 14 as illustrated in FIG. 1.

In the embodiment illustrated in FIGS. 2 and 3, the open upper end of the tube 30 is protected by a dome-shaped inner wall 36 on the inside of the pot. The inner wall includes a flat annular outer portion 37 which extends inwardly from the side wall 21 just above the lower edge 25 and a dome-shaped central portion 38. Referring to FIG. 4, the dome-shaped central portion is spaced upwardly from the dome 27 in the bottom wall and the upper edge 31 of the tube, and the flat portion 37 of the inner wall is provided with a plurality of openings 39. The inner wall 36 prevents the soil or other growing medium within the pot from falling through the tube 30.

When pot is watered, excess water will flow through the openings 39 in the inner wall into the space between the inner wall and the bottom wall. When the level of the water reaches the upper edge 31 of the tube 30, the water will flow down the inside surface of the tube and will drip downwardly from the lower edge 32. Since the lower edge is spaced below the portion of the dome 27 which surrounds the tube, the water cannot cling to the bottom wall and run outwardly to the outer edge of the bottom wall. The drip tube 30 therefore ensures that the water will drip downwardly from the center of the pot, and the drops will fall into the open upper end of the next pot even when the pots are hanging unevenly as illustrated in FIG. 1. The pots might hang unevenly because of an uneven distribution of soil, plants, water, etc., and this reduces the effective area of the open upper end of the pot which is available for catching the drops.

The dome-shaped portion 27 of the bottom wall spaces the lower edge 32 of the drip tube above the flat support portion 28 of the bottom wall and permits the pot to be supported on a flat surface without interference from the drip tube.

The upper edge 31 of the drip tube is positioned above the flat outer portion 37 of the inner wall 36, and this raises the level of water within the pot above the flat portion of the inner wall. The water which is retained above the inner wall is available for wicking into the soil. If desired, however, the upwardly projected upper edge 31 of the drip tube can be eliminated since it is the downwardly projected lower edge 32 which prevents water from running laterally outwardly from the opening 29 and which causes the water to drip downwardly. As used herein the term "drip tube" is thus meant to include a rim or tube of short axial extent which causes water to drip downwardly from the rim.

Figure 5:
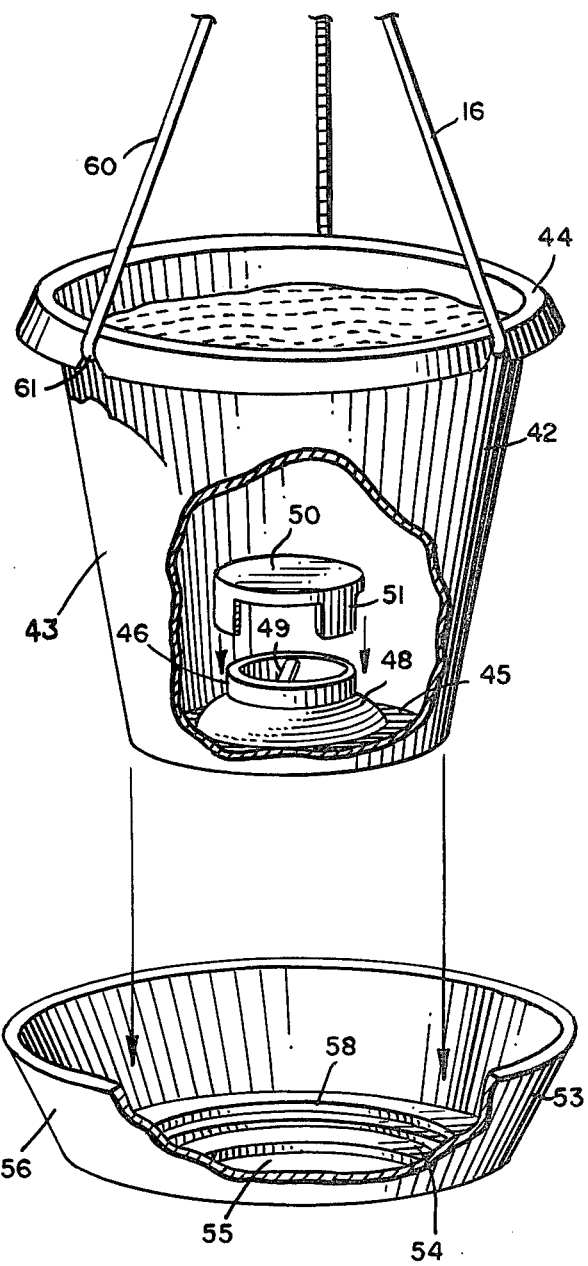
FIG. 5 is a view similar to FIG. 2 of another embodiment of the invention.
Figure 6:
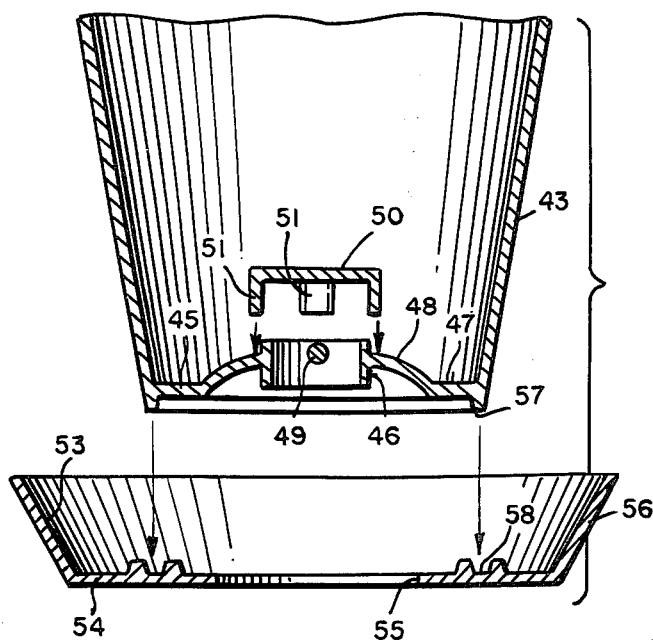
FIG. 6 is an exploded fragmentary sectional view of the pot of FIG. 5.

A modified embodiment of a pot 42 is shown in FIGS. 5 and 6. The pot includes a similar frusto-conical side wall 43 and an upper rim 44. However, the bottom wall 45 through which the drip tube 46 extends is formed integrally with the side wall. The bottom wall includes a flat annular portion 47 and a dome-shaped central portion 48. A hanging rod 49 extends across the drip tube, and a soil cap 50 is positioned over the tube to prevent soil from falling through the tube. The soil cap includes circumferentially spaced downwardly extending legs 51 which have a length greater than the distance which the drip tube extends above the dome 48 to provide openings or spaces between the cap and the drip tube through which water can flow.

The particular embodiment illustrated in FIGS. 5 and 6 also includes a decorative saucer 53 which is attached to the bottom of the pot. The saucer includes an annular central wall 54 having a central opening 55 and a frusto-conical side wall 56. The lower edge 57 of the side wall is inserted into a channel 58 in the saucer, and the parts may be secured by adhesive or the like.

The diameter of the central opening 55 is substantially greater than the diameter of the drip tube, and water which drips from the lower edge of the tube will fall through the opening 55 to the next pot.

Figure 7:
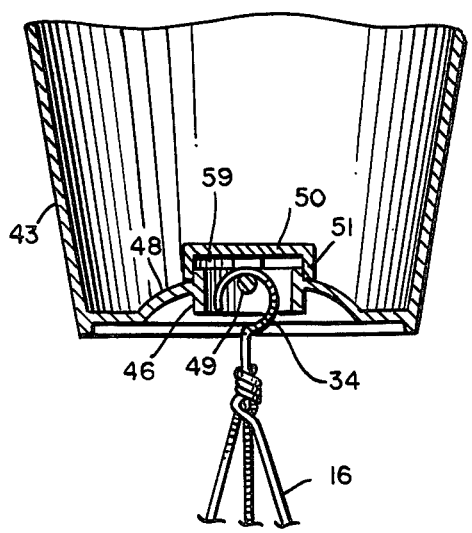
FIG. 7 is a fragmentary sectional view of the pot of FIGS. 5 and 6 without the saucer portion.

FIG. 7 illustrates the pot of FIGS. 5 and 6 without the saucer 53. The soil cap 50 is shown in its protective position over the drip tube 46, and the legs 51 of the soil cap space the top of the soil cap above the top of the drip tube to provide openings 59 through which water can flow from the pot. A hook 34 for supporting one of more lower pots is hooked over the hanger bar 49.

The hangers 16 which are illustrated in FIGS. 1, 2, and 5 consist of three metal rods 60 having upwardly turned bottom ends 61 which hold the top rim 22 of the pot. The upper ends of the rods are twisted around or otherwise secured to the hook 34. However, other types of hangers can be used with the pots, for example, chains, string, netting, or the like.

Figure 8:
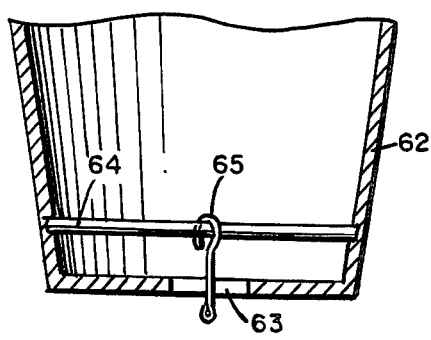
FIG. 8 is a fragmentary sectional view of a pot with a hanging bar but no drip tube.

FIG. 8 illustrates a pot 62 which is provided with an opening 63 in the bottom and a hanger bar 64 extending across the pot above the opening. The pot does not have a drip tube and is suitable for use with, for example, imitation flowers which do not need watering. The hanger bar is positioned within the pot so that the pot can rest on a flat surface without interference from the hanger bar. The bar is inserted into recesses in the side of the pot or otherwise suitably mounted, and a hook 65 is supported by the bar and supports one or more lower pots.

Figure 9:
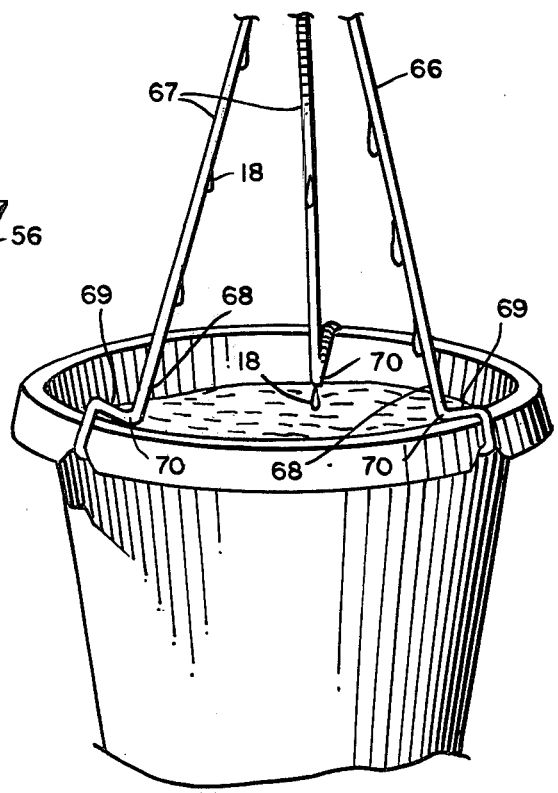
FIG. 9 is a fragmentary perspective view showing another form of hanging rods.

Another embodiment of a hanger is illustrated in FIG. 9. The hanger 66 is similar to the hanger 16 and includes three rods 67 which are formed of relatively rigid metal wire. The upper ends of the rods are connected to a hook 34 in the same manner as the rods 60, and the lower portion of each of the rods includes a drip portion which is formed by bending the rod in a generally S-shape to provide an upwardly extending portion 68 which extends outwardly and upwardly from a downwardly extending portion 69 to form a drip point 70 at the junction. If water drips onto the rods, either from the watering can or the next higher pot, the water will run down to the drip points, and, since the water cannot travel upwardly along the portions 69 of the rods, the water will drip downwardly from the drip points. The rods are formed so that each of the drip points is positioned inside of the upper edge of the pot so that the water will drip onto the soil.

If desired, the rods 67 can also be made from plastic which is molded into the desired shape.

Figure 10:
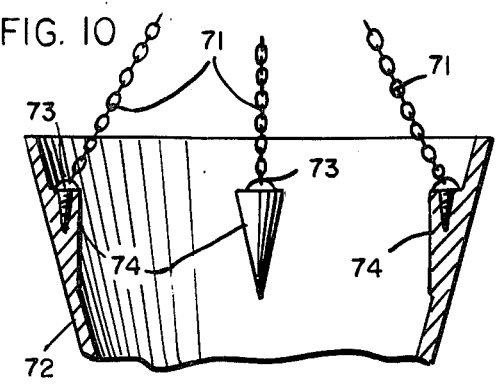
FIG. 10 is a fragmentary sectional view of still another form of hanger.

FIG. 10 illustrates the use of chains 71 to support a pot 72. The chains are secured inside of the pot by screws 73 which are inserted into laterally inwardly extending shoulder portions 74 on the side of the pot. The upper ends of the chains are attached to a hook which may be suported by a hanging bar of another pot. Since the chains are connected to the pot on the inside of the pot, any water which drips down the chain will run into the inside of the pot. Similarly, other types of hangers, such as wires, string, etc. can be used which are connected inside of the pot so that water does not drip outside of the pot.

Figure 11:
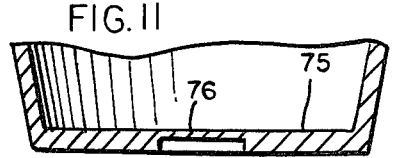
FIG. 11 is a fragmentary sectional view of a bottom of a pot in which the opening is closed by a removable disc.

Each of the pots illustrated can be formed of any suitable material, and mass-produced inexpensive plastic pots can be made by injection molding. If desired the pot can be formed with a closed bottom 75 (FIG. 11) which is provided with a disc-like portion 76 which is thinner than the remaining portion of the bottom or which is separated from the remaining portion by a line of weakness. If the pot is to be used individually or as the lowest pot of a group of hanging pots, it might be desirable to leave the disc 76 intact so that water does not drip from the lower pot. However, if an opening is needed, the disc 76 can easily be removed by punching it out with a blunt instrument or by cutting it out with a knife.

Figure 12:
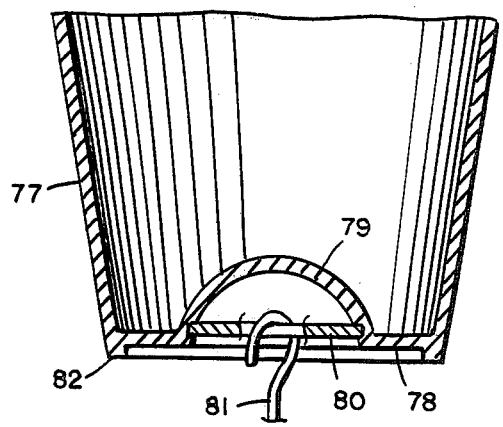
FIG. 12 is a fragmentary sectional view of another pot.

FIG. 12 illustrates a pot 77 which has a closed bottom wall 78. The bottom has a central dome-shaped portion 79, and a hanger bar 80 extends across the dome for supporting a hook 81 of another pot. The dome-shaped central portion of the bottom wall permits the hanger rod to be positioned above the lower edge 82 of the pot so that the pot can be supported on a flat surface without interference from the bar.

Figure 13:
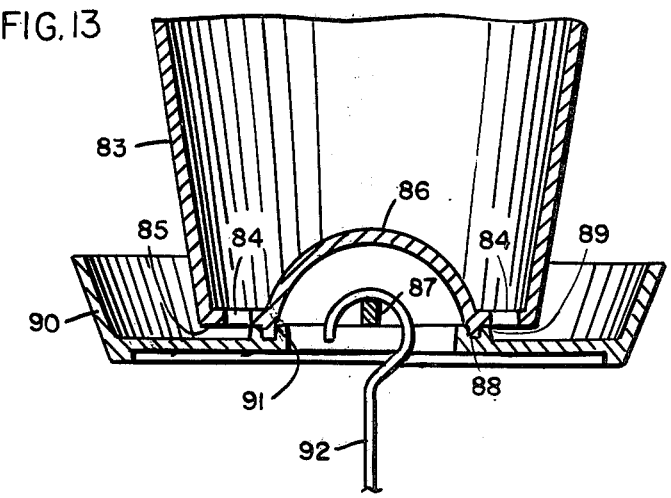
FIG. 13 is a fragmentary sectional view of still another pot.

The pot 77 is intended for use with artificial plants which do not need watering. FIG. 13 illustrates a similar pot 83 which has openings 84 in the bottom wall 85. The bottom wall has a similar dome-shaped central portion 86 in which a hanger for 87 is positioned, and a circular rim or bead 88 extends downwardly from the periphery of the dome. The rim is inserted into a circular channel 89 of a saucer 90 and secured therein by adhesive, press fit, etc. The saucer collects water which flows through the openings 84. The saucer is provided with a central opening 91 so that a hook 92 can be supported by the hanger for 87.

Although I have described the hanging means for the pots as a rod or bar, other hanging means could be used, for example, hooks, wires, or the like.

While in the foregoing specification I have described specific embodiments of my invention in considerable detail for the purpose of illustration, it will be understood that many of the details hereingiven may be varied considerably by those skilled in the art without departing from the spirit and scope of the invention.

I claim:

1. A flower pot having a side wall, an open top, a bottom wall, a drip tube extending through the bottom wall and having a lower edge positioned below the portion of the bottom wall surrounding the drip tube whereby water flowing from the pot through the drip tube will drip downwardly from the lower edge of the drip tube, and a rod extending across the drip tube for supporting a second flower pot below the drip tube of the first flower pot.

2. The flower pot of claim 1 in which the bottom wall includes a central dome-shaped portion through which the drip tube extends and an outer edge portion, the lower edge of the drip tube terminating above the outer edge portion of the bottom wall whereby the flower pot can be supported on a surface by the bottom wall without interference from the drip tube.

3. The flower pot of claim 2 in which the drip tube includes an upper edge which extends above the portion of the bottom wall surrounding the drip tube, and a cap extending over the upper edge of the drip tube to prevent soil from passing through the drip tube, portions of the cap being separated from portions of the drip tube to provide openings through which water can flow.

4. A pair of flower pots adapted for hanging in a generally vertically extending line, each of the flower pots having a side wall, an open top, a bottom wall, and a drip tube extending through the bottom wall and having a lower edge positioned below the portion of the bottom wall surrounding the drip tube whereby water flowing from the pot through the drip tube will drip downwardly from the lower edge of the drip tube, and means extending from the drip tube of one of the flower pots to the other flower pot for connecting the flower pots for hanging said other flower pot below said one flower pot whereby water dripping downwardly from the drip tube of the upper pot will fall into the open top of the lower pot.

5. The structure of claim 4 in which the connecting means includes a rod extending across the drip tube of the upper pot and a hanger extending from the rod to the lower pot for supporting the lower pot.

6. The structure of claim 4 in which the connecting means includes a bar extending across the drip tube of the upper pot and a plurality of relatively rigid rods extending from the bar to perimetrically spaced points around the periphery of the upper edge of the lower pot for supporting the lower pot, each of the rods including a generally S-shaped curved portion positioned inwardly of the upper edge of the lower pot whereby water flowing down the rods will drip from the S-shaped curved portion into the open top of the lower pot.

7. The structure of claim 4 in which the bottom wall of each of the pots includes a central dome-shaped portion through which the drip tube extends and an outer edge portion, the lower edge of the drip tube terminating above the outer edge portion of the bottom wall whereby the flower pot can be supported on a surface by the bottom wall without interference from the drip tube.

8. The structure of claim 7 in which the drip tube of each of the pots includes an upper edge which extends above the portion of the bottom wall surrounding the drip tube, and a cap extending over the upper edge of the drip tube to prevent soil from passing through the drip tube, portions of the cap being separated from portions of the drip tube to provide openings through which water can flow.

9. A flower pot having a side wall, an open top, a bottom wall, and a drip tube extending through the bottom wall and having a lower edge positioned below the portion of the bottom wall surrounding the drip tube whereby water flowing from the pot through the drip tube will drip downwardly from the lower edge of the drip tube, the bottom wall including a central dome-shaped portion through which the drip tube extends and an outer edge portion, the lower edge of the drip tube terminating above the outer edge portion of the bottom wall whereby the flower pot can be supported on a surface by the bottom wall without interference from the drip tube.

* * * * *